April 16, 1957 J. R. EBBELER 2,789,251
BLANKING CIRCUIT FOR TELEVISION RECEIVER
Filed June 29, 1954
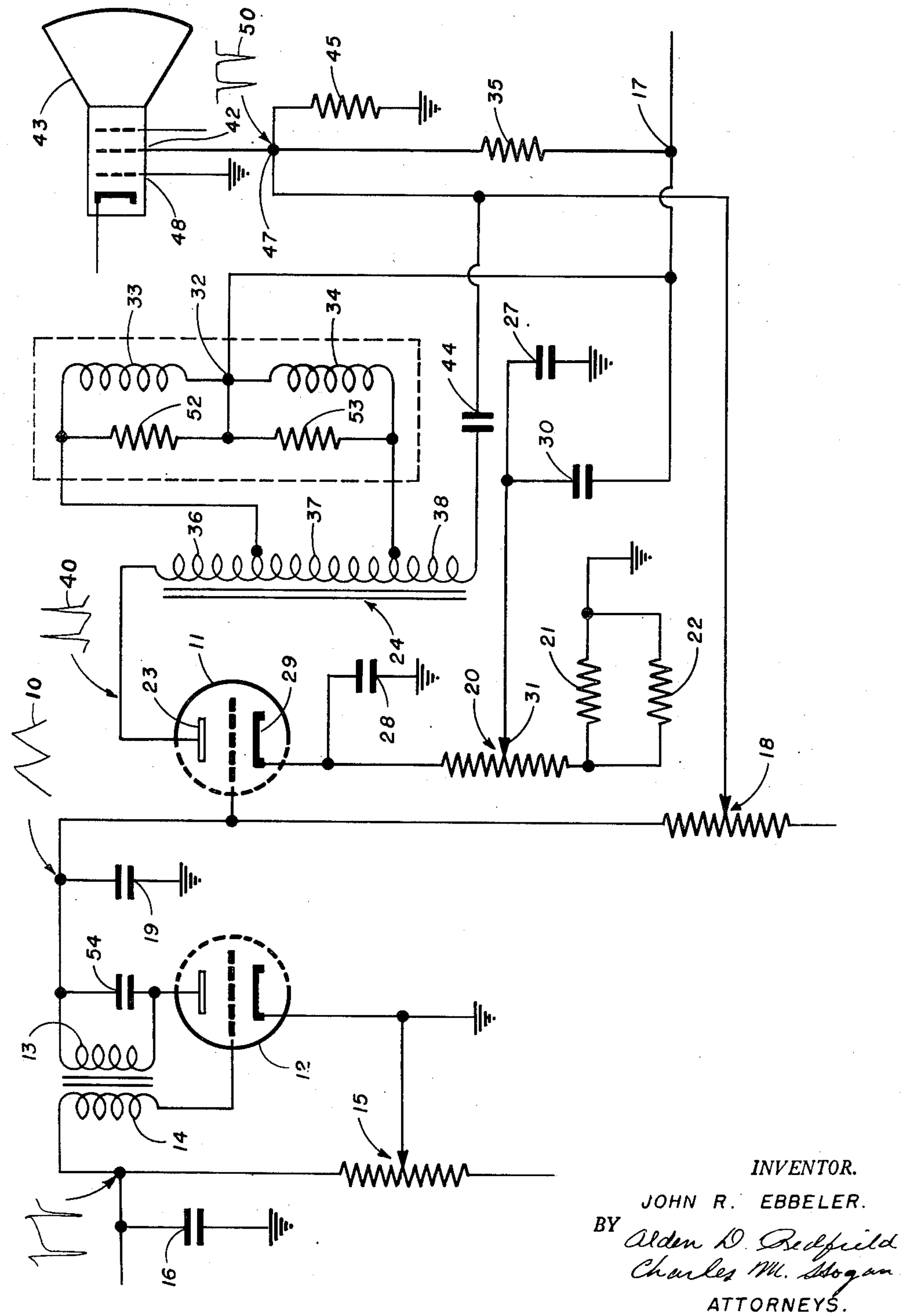
INVENTOR.
JOHN R. EBBELER
BY Alden D. Redfield
Charles M. Hogan
ATTORNEYS.

2,789,251

BLANKING CIRCUIT FOR TELEVISION RECEIVER

John R. Ebbeler, Cincinnati, Ohio, assignor to Avco Manufacturing Corporation, Cincinnati, Ohio, a corporation of Delaware Application June 29, 1954, Serial No. 440,216

2 Claims. (Cl. 315—20)

The present invention relates to vertical retrace blanking circuits, of particular utility in television receivers.

As stated in U. S. Patent 2,607,847 to Heisig, slanted luminous vertical retrace lines appear on the picture tube screen if the beam is not suppressed during its vertical return movements. The video signals which are broadcast by television transmitting stations include—in the manner described in various prior art publications, such as U. S. Patent No. 2,246,625 to Farnsworth—vertical blanking pulses for suppressing these vertical retrace lines to some extent. The blanking pulses alone have been found not to be sufficient completely to eliminate visible retrace lines. Various means have been provided in the receiver for blocking out the beam during vertical retrace, such as:

Means for deriving blanking pulses from the plate of the vertical deflecting system output tube and applying them to the control grid of the picture tube, as shown in U. S. Patent No. 2,215, 285 to Ballard; a similar means in which the blanking pulses are taken from the resistance-capacitance differentiating network included in the vertical system trapezoidal voltage generator, as shown in U. S. Patent No. 2,607,847 to Heisig; a tertiary winding-diode combination for developing blanking pulses and applying them to the cathode of the picture tube, as shown in U. S. Patent No. 2,560,815 to Oliver; various resistance-capacitance differentiating circuit networks in the vertical deflecting system, as shown in U. S. Patents No. 2,285,043 to Messner and No. 2,137,262 to Bowman-Manifold.

In some of these prior art blanking circuits the control grid (Grid No. 1) of the picture tube is not grounded, and when video signals of great intensity are applied to the cathode, the flow of control grid current smears the picture. In others of these prior-art blanking circuits a few visible horizontal lines occur during vertical retrace.

One object of the invention is to provide a vertical retrace blanking circuit in which the control grid of the picture tube may be grounded to prevent smearing of the picture.

Another object of the invention is to provide a blanking circuit which is more effective in suppressing retrace lines.

For a better understanding of the invention, together with other and further objects, advantages, and capabilities thereof, reference is made to the following description of the accompanying drawing, in the single figure of which there is shown a schematic diagram of a vertical deflecting system for a television receiver, including a vertical retrace blanking circuit in accordance with the invention.

In accordance with the invention there is provided in a television receiver the combination of a picture tube 43 having control and accelerating electrodes 48 and 42, a deflecting wave generating tube 11 having an anode 23, an auto-transformer 36, 37 in series with said anode, a pair of deflecting coils 33, 34 connected across the secondary of said auto-transformer, a source of space current having its positive terminal 17 connected to the junction of said coils, a retrace blanking circuit comprising, in combination, a winding 38 serially included in said auto-transformer for producing negative-polarity pulses 50 of the same frequency as said deflecting waves, and means 44 for applying said pulses to said picture tube to extinguish the beam during retrace.

Proceeding in greater detail, an input voltage wave of sawtooth waveform 10 is applied to the control electrode of the power output tube 11 of the vertical deflecting system. This voltage wave is produced by a blocking oscillator including triode 12. The plate and grid of tube 12 are connected to the secondary 13 and primary 14 of a blocking oscillator transformer. Primary 14 is connected to the junction of rheostat 15 and capacitor 16, the rheostat being the vertical hold control.

The anode of the oscillator tube 12 is connected to the high voltage terminal 17 of a source of space current through a rheostat 18 and a dropping resistor 35. The plate of the oscillator tube is coupled to the control grid of the vertical power output tube 11. The power amplifier circuit is of the type shown in the copending patent application of Paul F. G. Holst, Serial No. 353,859, entitled "Linearity Control for Television Receiver," filed May 8, 1953, and assigned to the same assignee as the present invention and application. This application issued November 6, 1954, as U. S. Patent No. 2,694,161. Reference is made to that copending application for a detailed description of the power amplifier circuit. Briefly, however, the cathode 29 of the amplifier tube 11 is connected to ground via potentiometer 20 and a parallel combination of series resistors 21 and 22. By-pass capacitor 27 is connected between ground and the sliding contact 31 of potentiometer 20. By-pass capacitor 28 is connected between cathode 29 and ground. In order to render linear the waveform output of tube 11, variable degeneration control is provided. Fixed bias on cathode 29 of tube 11 is provided by resistors 20, 21, and 22. Variable degeneration is provided by a feedback connection including capacitor 30, placed in circuit between adjustable contact 31 of potentiometer 20 and junction 32 of vertical deflecting coils 33 and 34.

In series with plate 23 of tube 11 is an iron core auto-transformer 24 comprising serially connected windings 36, 37, and 38, and the deflecting coils 33, 34 are connected across the secondary winding 37. Windings 36 and 37 constitute the primary. The conductive connection from junction point 32 to terminal 17 completes the high voltage supply circuit for anode 23 of tube 11.

Vertical output tube 11 produces an output voltage of the waveform illustrated at 40, characterized by narrow retrace pulses of positive polarity. In accordance with the present invention the winding 38 is added to the auto-transformer comprising windings 36 and 37 and is so phased as to supply blanking pulses 50 of negative polarity. The blanking pulses are applied to accelerating electrode 42 of picture tube 43 by a coupling circuit comprising series capacitor 44 and shunt resistor 45. Resistors 45 and 35 are connected in series between high voltage terminal 17 and ground. Capacitor 44 and accelerating electrode 42 are connected to junction 47 of resistors 35 and 45. The control electrode 48 of picture tube 43 is grounded. The remaining picture tube connections, such as those of the picture tube cathode, are identical to those of the Crosley Super-V Television Receiver, as shown in Crosley Service Information Bulletin No. 477 or the copending patent application of William H. Myers, Serial No. 430,875, filed in the United States Patent Office on May 19, 1954, entitled "Television Receiver Construction" and assigned to the same assignee as the present application and invention. Reference is made to those documents for a specific description of such connections.

The following illustrative parameters have been found to be satisfactory in one successful embodiment of the invention:

| | |
|---|---|
| Picture tube 43 | Type 21ATP 4. |
| Oscillator tube 12 | Half of Type 12BH7. |
| Vertical output tube 11 | Other half of Type 12BH7. |
| Rheostat 15 | 350,000 ohms—1 megohm. |
| Rheostat 18 | 5 megohms—1 megohm. |
| Potentiometer 20 | 750 ohms. |
| Resistor 21 | 7,500 ohms. |
| Resistor 22 | 68,000 ohms. |
| Resistor 35 | 390,000 ohms. |
| Resistor 45 | 820,000 ohms. |
| Resistor 52 | 22 ohms. |
| Resistor 53 | 22 ohms. |
| Capacitor 16 | 0.01 microfarad. |
| Capacitor 54 | 0.005 microfarad. |
| Capacitor 19 | 0.047 microfarad. |
| Capacitor 28 | 0.005 microfarad. |
| Capacitor 27 | 30 microfarads. |
| Capacitor 30 | 20 microfarads. |
| Capacitor 44 | 0.005 microfarad. |
| Plate voltage of tube 11 | 480 volts. |
| Plate voltage of tube 12 | 115 volts. |
| D. C. voltage between terminal 17 and ground | 480 volts. |
| D. C. voltage between terminal 47 and ground | 285 volts. |
| Impedance of primary at 60 cycles per second | 27,500 ohms, with 13 milliamperes D. C. current. |
| Size of wire, winding 37 | No. 28. |
| Size of wire, winding 36 | No. 39. |
| Size of wire, blanking winding #38 | No. 39. |
| Turns ratio, primary-secondary | 15:1. |
| D. C. resistance, primary | 1000 ohms. |
| Turns ratio between primary and blanking winding | 2.65:1. |
| D. C. resistance, secondary | 12 ohms. |
| D. C. resistance, blanking winding | 450 ohms. |

While there has been shown and described what is at present considered to be the preferred embodiment of the present invention, it will be obvious to those skilled in the art that various modifications and substitutions of equivalents may be made therein without departing from the true scope of the invention as defined by the appended claims.

I claim:

1. In a television receiver of the type including a cathode ray tube having an accelerating electrode and a deflecting-wave generating tube having at least an anode, a cathode and a control electrode, together with a source of space current having a negative terminal and a positive terminal adapted to be connected in a direct current path with said anode, an improved beam blanking circuit comprising the combination of: an auto-transformer, comprising a winding having a pair of terminals and an intermediate tapped section between said terminals, a connection from one of the transformer terminals to said anode, a pair of deflecting coils connected in series across said tapped section and having a junction between them, said tapped portion constituting the secondary of said auto-transformer, conductive connections from said junction to said positive source-terminal and from said cathode to the negative source-terminal to complete said path, said auto-transformer including a winding connected series-aiding between said tapped portion and the other of said transformer terminals for producing negative polarity pulses of the same frequency as said deflecting waves, a resistor connected between said positive terminal and said accelerating electrode to supply a D. C. voltage thereto, and means for applying said pulses to said accelerating electrode to extinguish the beam during retrace, said means comprising a series capacitor-shunt resistor coupling network.

2. In a television receiver of the type including a cathode ray tube having an accelerating electrode and a deflecting-wave generating tube having at least an anode, a cathode and a control electrode, together with a source of space current having a negative terminal and a positive terminal adapted to be connected in a direct current path with said anode, an improved beam blanking circuit comprising the combination of: an auto-transformer, comprising a winding having a pair of terminals, a connection from one of the transformer terminals to said anode, conductive connections from said transformer to said positive source-terminal and from said cathode to the negative source-terminal to complete said path, said auto-transformer including a winding connected series-aiding to the other of said transformer terminals for producing negative polarity pulses of the same frequency as said deflecting waves, a resistor connected between said positive terminal and said accelerating electrode to supply a D. C. voltage thereto, and means for applying said pulses to said accelerating electrode to extinguish the beam during retrace, said means comprising a series capacitor-shunt resistor coupling network.

References Cited in the file of this patent

Rider's Television Manual, vol. 12, Copyrighted Nov. 18, 1953, Admiral TV, pages 12–45; Firestone TV, pages 12–4; General Electric TV, pages 12–11.